(12) United States Patent
Ikeda (10) Patent No.: US 8,026,965 B2
(45) Date of Patent: Sep. 27, 2011

(54) IMAGE PICKUP APPARATUS AND METHOD FOR CONTROLLING THE SAME

(75) Inventor: Eiichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/171,101

(22) Filed: Jul. 10, 2008

(65) Prior Publication Data
US 2009/0015691 A1 Jan. 15, 2009

(30) Foreign Application Priority Data

Jul. 11, 2007 (JP) ................................. 2007-182560

(51) Int. Cl.
*H04N 9/64* (2006.01)
(52) U.S. Cl. ........................................ 348/251; 348/243
(58) Field of Classification Search .................. 348/241, 348/243, 251
See application file for complete search history.

(56) References Cited

U.S. PATENT DOCUMENTS

| 4,839,729 A * | 6/1989 | Ando et al. ..................... 348/241 |
| 6,144,408 A * | 11/2000 | MacLean ....................... 348/241 |
| 6,982,757 B2 * | 1/2006 | Tariki ............................ 348/243 |
| 7,113,210 B2 * | 9/2006 | Bloom .......................... 348/243 |
| 7,652,698 B2 * | 1/2010 | Morishita ..................... 348/251 |
| 2010/0157113 A1 * | 6/2010 | Kobayashi .................... 348/243 |

FOREIGN PATENT DOCUMENTS

JP 11-289494 A 10/1999

* cited by examiner

*Primary Examiner* — John Villecco
(74) *Attorney, Agent, or Firm* — Canon USA Inc. IP Division (57) ABSTRACT

An image pickup apparatus for applying high-speed dark shading correction and reducing random noise in a black image is provided. The image pickup apparatus has an image pickup element capable of reading image signals corresponding to one frame, which are obtained by photoelectric conversion, on a field-by-field basis. With the image pickup element exposed to light, first image signals corresponding to one frame are read. Then, with the image pickup element shielded from light, second image signals are read from fields that are fewer than fields constituting one frame. Each of third image signals is generated by averaging the second image signals for each of blocks obtained by dividing the image pickup element and converting the average image signal for each block to a resolution of the first image signals. The third image signals are subtracted from the first image signals.

8 Claims, 9 Drawing Sheets

FIELD NO.

| | | | | | | | |
|---|---|---|---|---|---|---|---|
| 1 | R | G | R | G | R | G | ... |
| 2 | G | B | G | B | G | B | |
| 3 | R | G | R | G | | | |
| 4 | G | B | G | B | | | |
| 5 | R | G | R | G | | | |
| 1 | G | B | G | B | | | |
| 2 | R | G | | | | | |
| 3 | G | B | | | | | |
| 4 | | | | | | | |
| 5 | | | | | | | |

FIG. 3B

|   | 0 | 1 | 2 | ..... | | | m−1 |
|---|---|---|---|---|---|---|---|
| 0 | | | | | | | |
| 1 | | | | | | | |
| 2 | | | | | | | |
| ⋮ | | | | | | | |
| n−1 | | | | | | | |

FIG. 4A

| ISO | MINIMUM NUMBER OF ADDITIONAL PIXELS (n) | NUMBER OF FIELDS (k) |
|---|---|---|
| 100 | 4 | 1 |
| 200 | 16 | 1 |
| 400 | 64 | 1 |
| 800 | 256 | 1 |
| 1600 | 1024 | 4 |

FIG. 4B

| NUMBER OF FIELDS (k) | READING TIME(ms) | NUMBER OF PIXELS PER BLOCK |
|---|---|---|
| 1 | 50 | 336 |
| 2 | 100 | 672 |
| 3 | 150 | 1008 |
| 4 | 200 | 1344 |
| 5 | 250 | 1728 |

FIG. 6A

|   | 0 | 1 | 2 | 3 | 4 | 5 | 6 | 127 |
|---|---|---|---|---|---|---|---|-----|
| 0 | 50 | 55 | 57 | 59 | | | | |
| 1 | 52 | 60 | 60 | 62 | | | | |
| 2 | 54 | 61 | 65 | 67 | | | | |
| 3 | 56 | 60 | 66 | 70 | | | | |
| 4 | | | | | | | | |
| 5 | | | | | | | | |
| 6 | | | | | | | | |
| 7 | | | | | | | | |
| 127 | | | | | | | | |

FIG. 6B

|   | 0 | 1 | 2 | ... | 63 |
|---|---|---|---|-----|----|
| 0 | 54 | 59 | | | |
| 1 | 57 | 67 | | | |
| 2 | | | | | |
| 3 | | | | | |
| ... | | | | | |
| 63 | | | | | |

FIG. 6C

|   | 0 | 1 | 2 | 3 | 4 | 5 | 6 | 127 |
|---|---|---|---|---|---|---|---|-----|
| 0 | 54 | 54 | 59 | 59 | | | | |
| 1 | 54 | 54 | 59 | 59 | | | | |
| 2 | 57 | 57 | 67 | 67 | | | | |
| 3 | 57 | 57 | 67 | 67 | | | | |
| 4 | | | | | | | | |
| 5 | | | | | | | | |
| 6 | | | | | | | | |
| 7 | | | | | | | | |
| 127 | | | | | | | | |

FIG. 7A

| | 0 | 1 | 2 | 3 | 4 | 5 | 6 | 7 | 8 | 9 | 10 | 11 | 12 | 13 | | 126 | 127 |
|---|---|---|---|---|---|---|---|---|---|---|---|---|---|---|---|---|---|
| 0 | 1 | 1 | 1 | 1 | 1 | 1 | 1 | 1 | 0.5 | 0 | 0 | 0 | 0 | 0 | | | 0 |
| 1 | 1 | 1 | 1 | 1 | 1 | 1 | 1 | 1 | 0.5 | 0 | 0 | 0 | 0 | 0 | | | 0 |
| 2 | 1 | 1 | 1 | 1 | 1 | 1 | 1 | 1 | 0.5 | 0 | 0 | 0 | 0 | 0 | | | 0 |
| 3 | 1 | 1 | 1 | 1 | 1 | 1 | 1 | 1 | 0.5 | 0 | 0 | 0 | 0 | 0 | | | 0 |
| 4 | 1 | 1 | 1 | 1 | 1 | 1 | 1 | 1 | 0.5 | 0 | 0 | 0 | 0 | 0 | | | 0 |
| 5 | 1 | 1 | 1 | 1 | 1 | 1 | 1 | 1 | 0.5 | 0 | 0 | 0 | 0 | 0 | | | 0 |
| 6 | 1 | 1 | 1 | 1 | 1 | 1 | 1 | 1 | 0.5 | 0 | 0 | 0 | 0 | 0 | | | 0 |
| 7 | 1 | 1 | 1 | 1 | 1 | 1 | 1 | 1 | 0.5 | 0 | 0 | 0 | 0 | 0 | | | 0 |
| 8 | 1 | 1 | 1 | 1 | 1 | 1 | 1 | 1 | 0.5 | 0 | 0 | 0 | 0 | 0 | | | 0 |
| 9 | 1 | 1 | 1 | 1 | 1 | 1 | 1 | 1 | 0.5 | 0 | 0 | 0 | 0 | 0 | | | 0 |
| 10 | 1 | 1 | 1 | 1 | 1 | 1 | 1 | 1 | 0.5 | 0 | 0 | 0 | 0 | 0 | | | 0 |
| 11 | 1 | 1 | 1 | 1 | 1 | 1 | 1 | 1 | 0.5 | 0 | 0 | 0 | 0 | 0 | | | 0 |
| 12 | 1 | 1 | 1 | 1 | 1 | 1 | 1 | 1 | 0.5 | 0 | 0 | 0 | 0 | 0 | | | 0 |
| 13 | 1 | 1 | 1 | 1 | 1 | 1 | 1 | 1 | 0.5 | 0 | 0 | 0 | 0 | 0 | | | 0 |
| 14 | 1 | 1 | 1 | 1 | 1 | 1 | 1 | 1 | 0.5 | 0 | 0 | 0 | 0 | 0 | | | 0 |
| 15 | 1 | 1 | 1 | 1 | 1 | 1 | 1 | 1 | 0.5 | 0 | 0 | 0 | 0 | 0 | | | 0 |
| 16 | 0.5 | 0.5 | 0.5 | 0.5 | 0.5 | 0.5 | 0.5 | 0.5 | 0.5 | 0 | 0 | 0 | 0 | 0 | | | 0 |
| 17 | 0 | 0 | 0 | 0 | 0 | 0 | 0 | 0 | 0 | 0 | 0 | 0 | 0 | 0 | | | 0 |
| 18 | 0 | 0 | 0 | 0 | 0 | 0 | 0 | 0 | 0 | 0 | 0 | 0 | 0 | 0 | | | 0 |
| 19 | 0 | 0 | 0 | 0 | 0 | 0 | 0 | 0 | 0 | 0 | 0 | 0 | 0 | 0 | | | 0 |
| ⋮ | | | | | | | | | | | | | | | | | |
| 126 | 0 | 0 | 0 | 0 | 0 | 0 | 0 | 0 | 0 | 0 | 0 | 0 | 0 | 0 | | 0 | 0 |
| 127 | 0 | 0 | 0 | 0 | 0 | 0 | 0 | 0 | 0 | 0 | 0 | 0 | 0 | 0 | | 0 | 0 |

FIG. 7B

| | 0 | 1 | 2 | 3 | 4 | 5 | 6 | 7 | 8 | 9 | 10 | 11 | 12 | 13 | | 126 | 127 |
|---|---|---|---|---|---|---|---|---|---|---|---|---|---|---|---|---|---|
| 0 | 0.8 | 0.8 | 0.8 | 0.6 | 0.6 | 0.6 | 0.5 | 0.5 | 0.5 | 0 | 0 | 0 | 0 | 0 | | | 0 |
| 1 | 0.8 | 0.8 | 0.8 | 0.6 | 0.6 | 0.5 | 0.5 | 0.5 | 0.5 | 0 | 0 | 0 | 0 | 0 | | | 0 |
| 2 | 0.8 | 0.8 | 0.8 | 0.6 | 0.5 | 0.5 | 0.5 | 0.5 | 0.5 | 0 | 0 | 0 | 0 | 0 | | | 0 |
| 3 | 0.8 | 0.8 | 0.8 | 0.5 | 0.5 | 0.5 | 0.5 | 0.5 | 0.5 | 0 | 0 | 0 | 0 | 0 | | | 0 |
| 4 | 0.8 | 0.8 | 0.8 | 0.5 | 0.5 | 0.5 | 0.5 | 0.5 | 0.5 | 0 | 0 | 0 | 0 | 0 | | | 0 |
| 5 | 0.6 | 0.6 | 0.6 | 0.5 | 0.5 | 0.5 | 0.5 | 0.5 | 0.5 | 0 | 0 | 0 | 0 | 0 | | | 0 |
| 6 | 0.6 | 0.6 | 0.6 | 0.5 | 0.5 | 0.5 | 0.5 | 0.5 | 0.5 | 0 | 0 | 0 | 0 | 0 | | | 0 |
| 7 | 0.6 | 0.6 | 0.5 | 0.5 | 0.5 | 0.5 | 0.5 | 0.5 | 0.5 | 0 | 0 | 0 | 0 | 0 | | | 0 |
| 8 | 0.5 | 0.5 | 0.5 | 0.5 | 0.5 | 0.5 | 0.5 | 0.5 | 0.5 | 0 | 0 | 0 | 0 | 0 | | | 0 |
| 9 | 0.5 | 0.5 | 0.5 | 0.5 | 0.5 | 0.5 | 0.5 | 0.5 | 0.5 | 0 | 0 | 0 | 0 | 0 | | | 0 |
| 10 | 0.5 | 0.5 | 0.5 | 0.5 | 0.5 | 0.5 | 0.5 | 0.5 | 0.5 | 0 | 0 | 0 | 0 | 0 | | | 0 |
| 11 | 0.5 | 0.5 | 0.5 | 0.5 | 0.5 | 0.5 | 0.5 | 0.5 | 0.5 | 0 | 0 | 0 | 0 | 0 | | | 0 |
| 12 | 0.5 | 0.5 | 0.5 | 0.5 | 0.5 | 0.5 | 0.5 | 0.5 | 0.5 | 0 | 0 | 0 | 0 | 0 | | | 0 |
| 13 | 0.5 | 0.5 | 0.5 | 0.5 | 0.5 | 0.5 | 0.5 | 0.5 | 0.5 | 0 | 0 | 0 | 0 | 0 | | | 0 |
| 14 | 0.5 | 0.5 | 0.5 | 0.5 | 0.5 | 0.5 | 0.5 | 0.5 | 0.5 | 0 | 0 | 0 | 0 | 0 | | | 0 |
| 15 | 0.5 | 0.5 | 0.5 | 0.5 | 0.5 | 0.5 | 0.5 | 0.5 | 0.5 | 0 | 0 | 0 | 0 | 0 | | | 0 |
| 16 | 0.5 | 0.5 | 0.5 | 0.5 | 0.5 | 0.5 | 0.5 | 0.5 | 0.5 | 0 | 0 | 0 | 0 | 0 | | | 0 |
| 17 | 0 | 0 | 0 | 0 | 0 | 0 | 0 | 0 | 0 | 0 | 0 | 0 | 0 | 0 | | | 0 |
| 18 | 0 | 0 | 0 | 0 | 0 | 0 | 0 | 0 | 0 | 0 | 0 | 0 | 0 | 0 | | | 0 |
| 19 | 0 | 0 | 0 | 0 | 0 | 0 | 0 | 0 | 0 | 0 | 0 | 0 | 0 | 0 | | | 0 |
| ⋮ | | | | | | | | | | | | | | | | | |
| 126 | 0 | 0 | 0 | 0 | 0 | 0 | 0 | 0 | 0 | 0 | 0 | 0 | 0 | 0 | | 0 | 0 |
| 127 | 0 | 0 | 0 | 0 | 0 | 0 | 0 | 0 | 0 | 0 | 0 | 0 | 0 | 0 | | 0 | 0 |

FIG. 8A

| SHUTTER SPEED | TEMPERATURE | | | |
|---|---|---|---|---|
| | T<20 | 20<T<40 | 40<T<60 | 60<T |
| Tv<1/30 | 0 | 0 | 2 | 5 |
| 1/30<Tv<1/8 | 0 | 2 | 4 | 10 |
| 1/8<Tv<1 | 2 | 4 | 10 | 20 |
| 1<Tv | 5 | 10 | 20 | 30 |

FIG. 8B

| SHUTTER SPEED | TEMPERATURE | | | |
|---|---|---|---|---|
| | T<20 | 20<T<40 | 40<T<60 | 60<T |
| Tv<1/30 | 0 | 20 | 40 | 70 |
| 1/30<Tv<1/8 | 0 | 40 | 80 | 128 |
| 1/8<Tv<1 | 30 | 70 | 112 | 220 |
| 1<Tv | 66 | 120 | 250 | 400 |

IMAGE PICKUP APPARATUS AND METHOD FOR CONTROLLING THE SAME

BACKGROUND OF THE INVENTION

1. Field of the Invention

The present invention relates to image pickup apparatuses and methods for controlling the same, and more particularly, to an image pickup apparatus for applying dark shading correction and a method for controlling the same.

2. Description of the Related Art

For image pickup elements such as charge-coupled device (CCD) sensors and complimentary mental-oxide semiconductor (CMOS) sensors used in image pickup apparatuses such as digital cameras, various dark shading correction methods for correcting image data for dark noise have been proposed in the related art.

Figure 10:
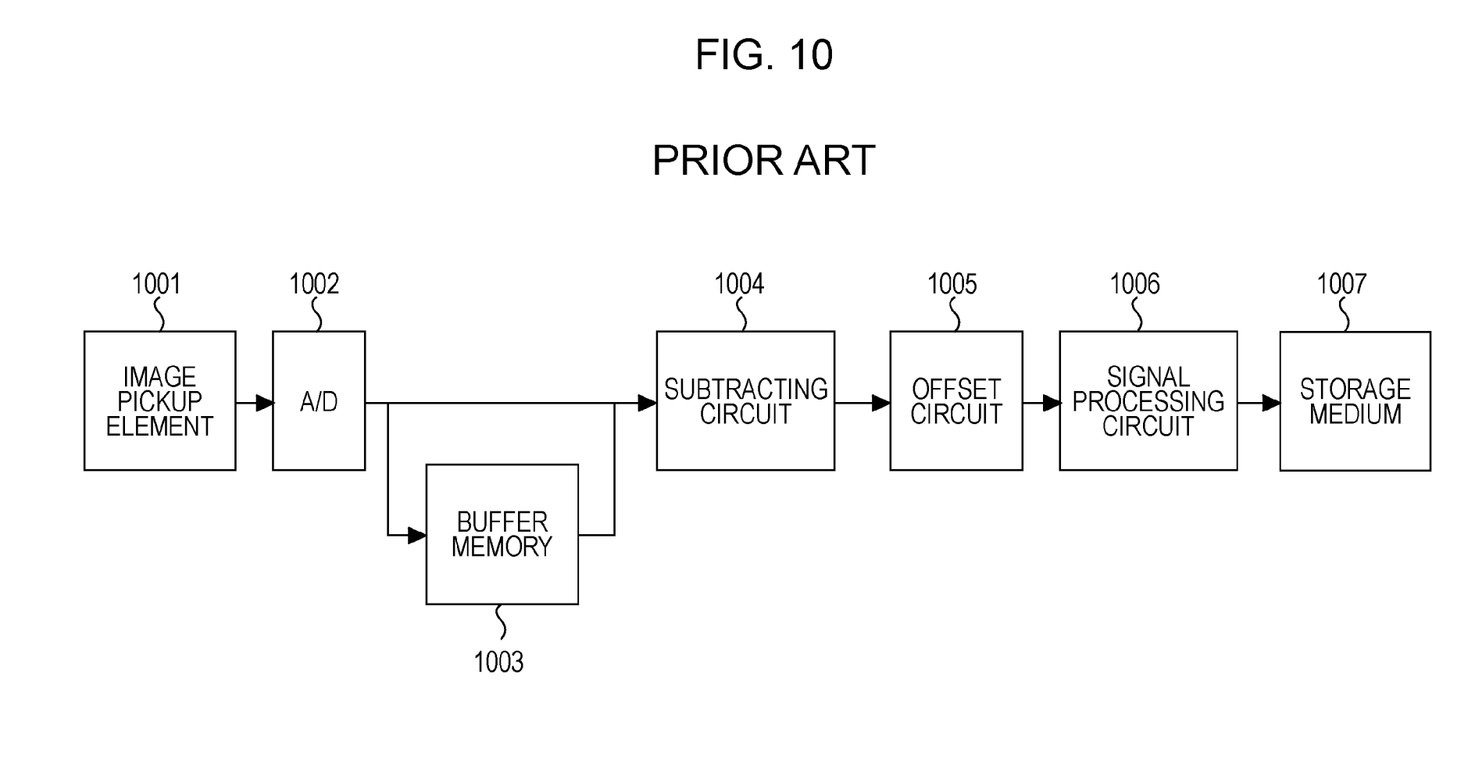
FIG. 10 is a schematic block diagram of an exemplary functional structure of an existing image pickup apparatus.

FIG. 10 is a schematic block diagram of an exemplary functional structure of a digital camera for applying existing dark shading correction. The camera shown in FIG. 10 takes a photograph of an object using an image pickup element 1001 under image pickup conditions (aperture, shutter speed, and sensitivity) determined by an exposure control operation, and reads electric charge signals accumulated in the image pickup element 1001. The read electric charge signals are converted into digital signals by an analog-to-digital (A/D) converter 1002, and the digital signals are stored as image signals (hereinafter referred to as "object image signals") in a buffer memory 1003. Next, under the same image pickup conditions, the camera takes a photograph with the image pickup element 1001 shielded from light to obtain electric charge signals, and the electric charge signals are converted into digital signals by the A/D converter 1002. The digital signals or image signals obtained in this manner are referred to as "black image signals".

At the same time as the black image signals are output from the A/D converter 1002, the object image signals stored in the buffer memory 1003 are read. A subtracting circuit 1004 subtracts the black image signals from the corresponding object image signals, thereby applying dark shading correction to the object image signals. An arbitrary offset value (e.g., about 32 least significant bits (LSB) of a 10-bit signal) is added to each of the dark-shading-corrected object image signals by an offset circuit 1005, and the sum signals are sent to a signal processing circuit 1006, which in turn generates image signals representing one image. The image signals generated in this manner are stored in a general storage medium 1007, such as an SD card.

However, since the above-described dark shading correction method uses image signals representing two images, namely, the object image signals and the black image signals, random noise is increased $\sqrt{2}$ times, compared with the case where no dark shading correction is applied. Since two images are captured and read, it takes time to complete the image pickup operation.

For example, Japanese Patent Laid-Open No. 11-289494 describes a method configured to divide black image signals into multiple blocks, integrate signals on a block-by-block basis, enlarge the integrated signals to a resolution of an object image, and subtract the enlarged signals from object image signals. According to this method, random noise of the black image signals is reduced. Therefore, deterioration of the dark-shading-corrected image signals due to noise can be reduced.

However, even in the method described in Japanese Patent Laid-Open No. 11-289494, in order to obtain image signals representing one object image, as has been described with reference to FIG. 10, image signal capturing and reading operations are performed twice. Therefore, it takes time to complete the image pickup operation. In a continuous shooting mode, the speed of taking photographs in a continuous manner drops greatly.

SUMMARY OF THE INVENTION

An embodiment of the present invention provides an image pickup apparatus configured to apply high-speed dark shading correction and to reduce random noise included in a black image, and a method for controlling the same.

According to an aspect of the present invention, there is provided an image pickup apparatus including an image pickup element capable of reading image signals corresponding to one frame including a plurality of fields on a field-by-field basis, the image signals being obtained by photoelectric conversion; a control unit configured to perform a control operation to read first image signals corresponding to one frame with the image pickup element being exposed to light and to read second image signals corresponding to fields fewer than the plurality of fields constituting one frame with the image pickup element being shielded from light; a black image generating unit configured to generate third image signals, each of which is generated by calculating an average of the second image signals for each of multiple blocks obtained by dividing the image pickup element and converting the average image signal for each block to a resolution of the first image signals; and a subtracting unit configured to subtract the third image signals from the first image signals.

According to another aspect of the present invention, there is provided an image pickup apparatus including an image pickup element capable of reading image signals corresponding to one frame including a plurality of fields on a field-by-field basis, the image signals being obtained by photoelectric conversion; a control unit configured to perform a control operation to read first image signals corresponding to one frame with the image pickup element being exposed to light and to read second image signals corresponding to fields, the number of which is determined based on a sensitivity of the image pickup element, with the image pickup element being shielded from light; a black image generating unit configured to generate third image signals, each of which is generated by calculating an average of the second image signals for each of multiple blocks obtained by dividing the image pickup element, to generate fourth image signals, each of which is generated by adding the third image signals for a plurality of blocks, calculating an average of the added third image signals, and converting the average image signal to a resolution of the plurality of blocks, to generate fifth image signals by performing weighted additions of the third image signals and the fourth image signals on a block-by-block basis based on a correction table, and to generate sixth image signals by converting the fifth image signals to a resolution of the first image signals; and a subtracting unit configured to subtract the sixth image signals from the first image signals.

According to another aspect of the present invention, there is provided a method for controlling an image pickup apparatus including an image pickup element capable of reading image signals corresponding to one frame including a plurality of fields on a field-by-field basis, the image signals being obtained by photoelectric conversion, the method including the steps of: performing a control operation to read first image signals corresponding to one frame with the image pickup element being exposed to light and to read second image signals corresponding to fields fewer than the plurality of fields constituting one frame with the image pickup element being shielded from light; generating third image signals, each of which is generated by calculating an average of the second image signals for each of multiple blocks obtained by dividing the image pickup element and converting the average image signal for each block to a resolution of the first image signals; and subtracting the third image signals from the first image signals.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

First Exemplary Embodiment

Figure 1:
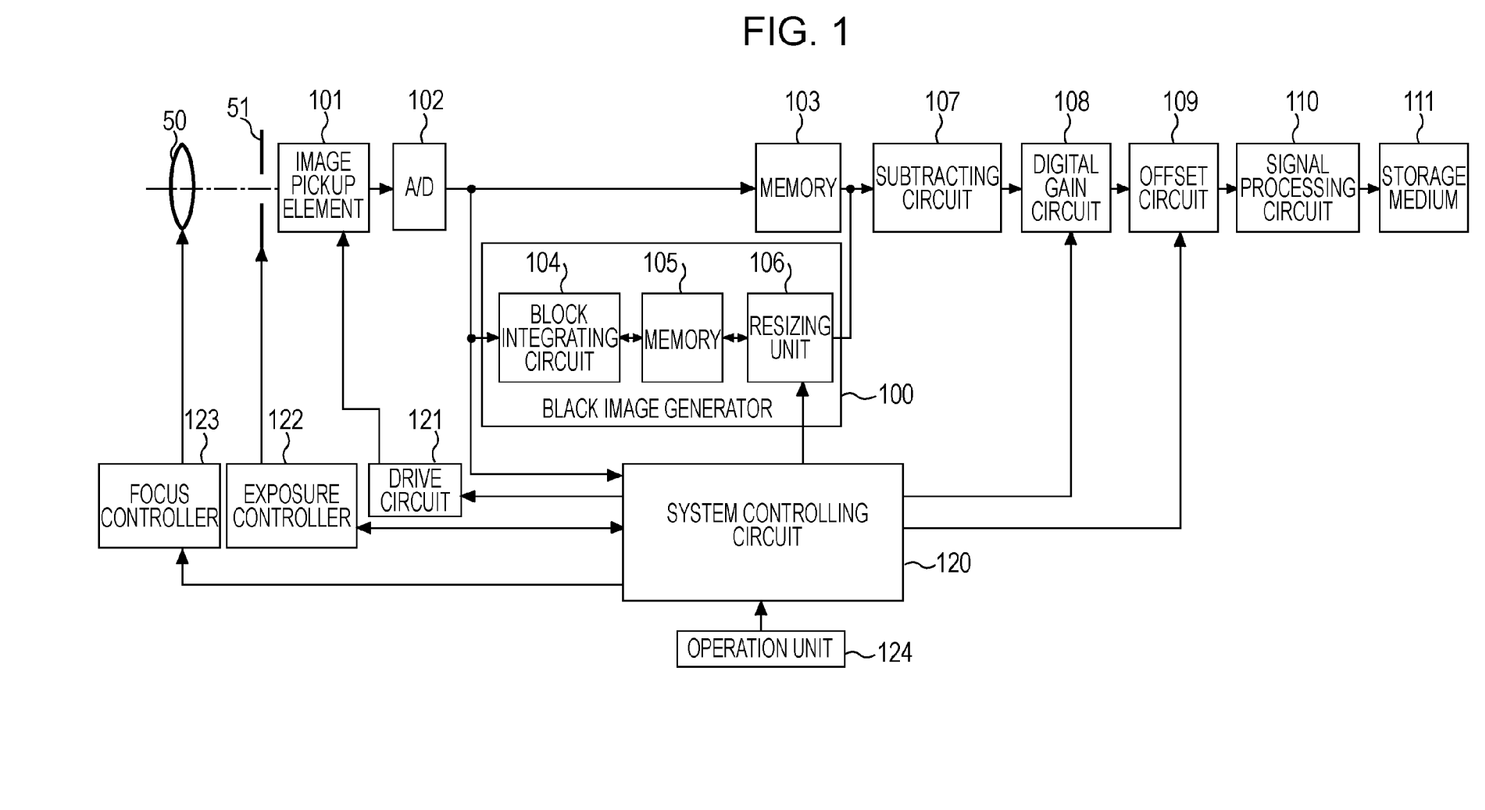
FIG. 1 is a block diagram of a functional structure of an image pickup apparatus according to a first exemplary embodiment of the present invention.

FIG. 1 is a block diagram of an exemplary schematic structure of an image pickup apparatus for applying dark shading correction according to a first exemplary embodiment of the present invention.

Referring to FIG. 1, the image pickup apparatus includes a system controlling circuit 120 for controlling the entire image pickup apparatus, and an image taking lens unit 50. Although the image taking lens unit 50 is shown as one lens in FIG. 1, the image taking lens unit 50 actually includes a plurality of lenses including a focus lens and a zoom lens. Under control of the system controlling circuit 120, a focus controller 123 controls the focus lens included in the image taking lens unit 50. A mechanical shutter 51 has an aperture function. Under control of the system controlling circuit 120, an exposure controller 122 controls the mechanical shutter 51.

Figure 3A:
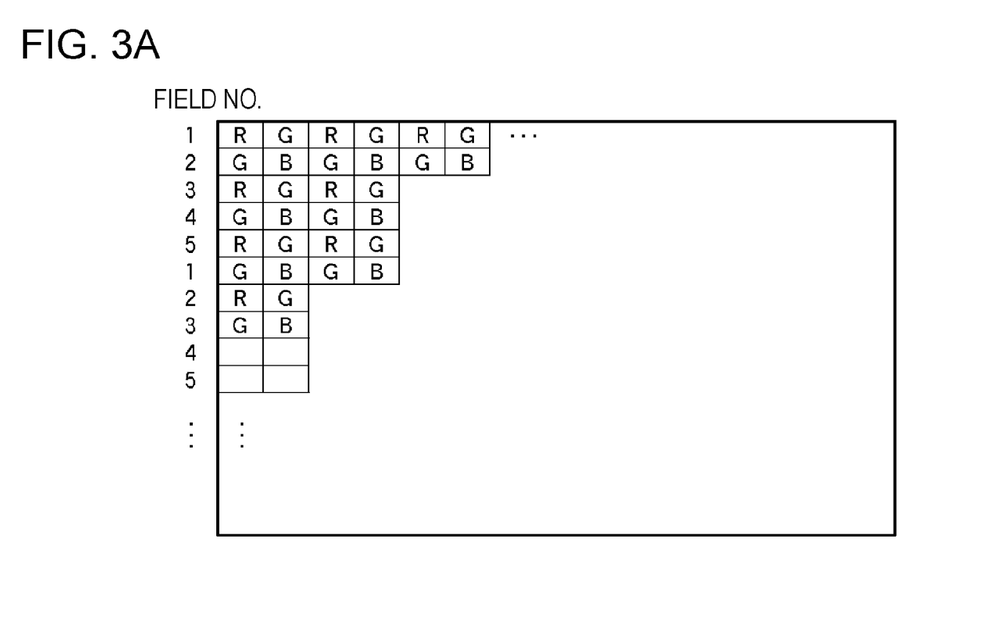
FIGS. 3A and 3B are illustrations for describing an example of 5-field reading and block division of an image pickup element according to the first exemplary embodiment.

An image pickup element 101 is represented by a CCD sensor or a CMOS sensor. The image pickup element 101 generates and outputs electric charge according to the intensity of incident light by performing photoelectric conversion. From the image pickup element 101, electric charge can be read every other row or every third, fourth, . . . row. That is, one frame can be divided into a plurality of fields, and reading can be performed on a field-by-field basis. In the first exemplary embodiment, as shown in FIG. 3A, one frame is divided into five fields, and electric charge corresponding to one frame can be read on a field-by-field basis.

Referring back to FIG. 1, under control of the system controlling circuit 120, a drive circuit 121 drives the image pickup element 101. That is, the system controlling circuit 120 and the drive circuit 121 constitute a control unit.

An A/D converter 102 converts electric charge signals output from the image pickup element 101 into digital signals. A memory 103 stores the digital signals output from the A/D converter 102. Using the digital signals output from the A/D converter 102, the system controlling circuit 120 performs a through-the-lens (TTL) autofocus (AF) process, an automatic exposure (AE) process, and a pre-flash (EF) process.

A black image generator 100 generates black image signals. The black image generator 100 includes a block integrating circuit 104, a memory 105, and a resizing unit 106. The block integrating circuit 104 integrates digital signals output from the A/D converter 102 on a block-by-block basis, calculates an average thereof for each block using the integrated number of pixels, and obtains a block average signal for each block. The memory 105 stores block average signals supplied from the block integrating circuit 104. The resizing unit 106 resizes the block average signals stored in the memory 105 to a specified resolution.

The image pickup apparatus further includes a subtracting circuit 107 that subtracts the resized signals obtained by the resizing unit 106 from the digital signals stored in the memory 103, a digital gain circuit 108, an offset circuit 109, a signal processing circuit 110, and a storage medium 111.

An operation unit 124 includes, for example, a shutter button and a mode selecting dial. Using the operation unit 124, a user or photographer gives an instruction to the image pickup apparatus. The entered instruction is sent to the system controlling circuit 120.

Figure 2:
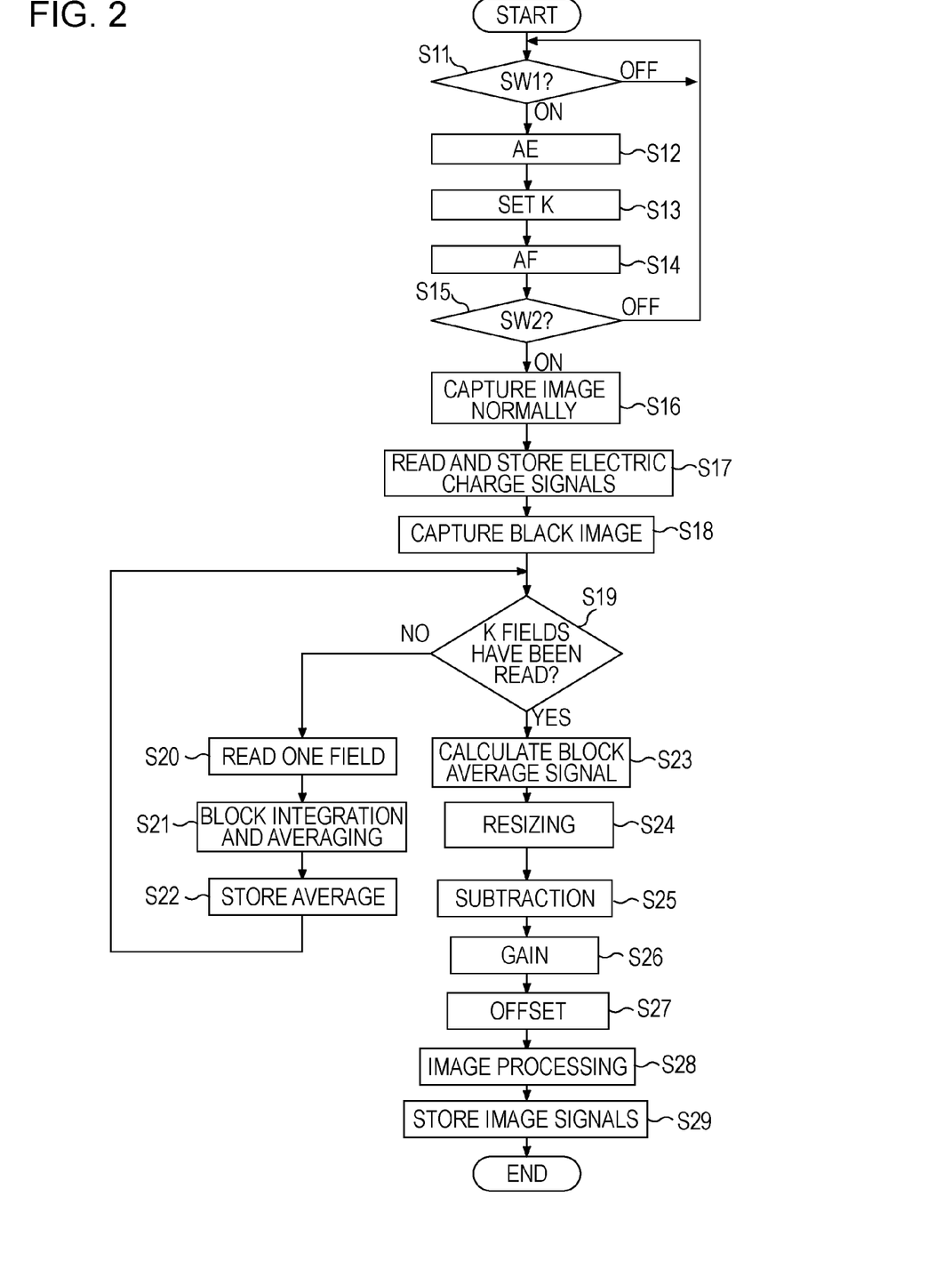
FIG. 2 is a flowchart of an image pickup operation according to the first exemplary embodiment.

FIG. 2 is a flowchart of an image pickup operation of the image pickup apparatus according to the present embodiment. Referring to FIGS. 1 and 2, a dark shading correction method according to the present embodiment is described.

In step S11, the system controlling circuit 120 waits for a switch SW1 to be turned on, which is turned on by performing a halfway operation, such as half pressing the shutter button included in the operation unit 124. When the switch SW1 is turned on, the flow proceeds to step S12, and exposure control is performed. In exposure control, the system controlling circuit 120 determines exposure conditions, such as aperture, shutter speed, and sensitivity, used to capture an image.

In step S13, the system controlling circuit 120 determines the number of fields K to be read from the image pickup element 101, which are to be input to the block integrating circuit 104 when a black image for applying dark shading correction is captured, in accordance with the sensitivity determined in step S12. The processing performed in step S13 is described in detail later.

In step S14, focus adjustment control is performed. In focus adjustment control, the system controlling circuit 120 controls the focus lens included in the image taking lens unit 50 via the focus controller 123 to adjust focus on an object. In step S15, the system controlling circuit 120 determines whether a switch SW2 is turned on, which is turned on by, for example, pressing the shutter button all the way down. When the switch SW2 is not turned on, the flow returns to step S11, and the foregoing process is repeated. When the switch SW2 is turned on, the flow proceeds to step S16.

In step S16, the system controlling circuit 120 controls the exposure controller 122 and the drive circuit 121 based on the exposure conditions determined in step S12 to capture an image of the object. When capturing of the image of the object is completed, in step S17, the system controlling circuit 120 reads all electric charge signals accumulated in the image pickup element 101. That is, the processing performed in steps S16 and S17 corresponds to a first reading step. The read electric charge signals are converted by the A/D converter 102 into digital signals, and the digital signals are stored as image signals (hereinafter referred to as "object image signals") in the memory 103. The object image signals correspond to first image signals.

Next, an image (black image) is captured under the same image pickup conditions with the image pickup element 101 shielded from light using the mechanical shutter 51 (step S18). In steps S20 to S22, the system controlling circuit 120 reads electric charge signals (second image signals) from the image pickup element 101. This time, the reading is performed on a field-by-field basis. That is, the processing performed in steps S20 to S22 corresponds to a second reading step.

Figure 3B:
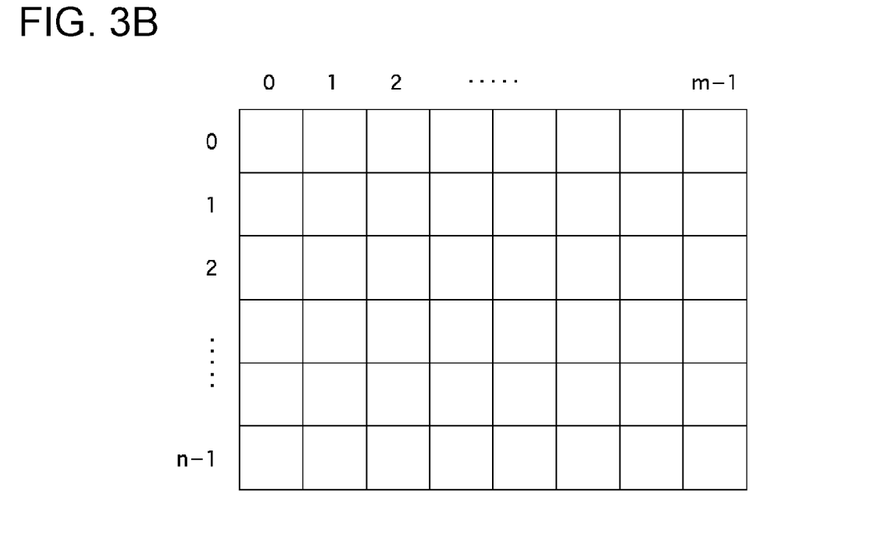

As described above, according to the present embodiment, as shown in FIG. 3A, one frame can be divided into five fields, and electric charge signals corresponding to one frame can be read every fifth row from the image pickup element 101. The black image generator 100 divides pixels in an effective area of the image pickup element 101 into two-dimensional m×n blocks (m corresponds to the horizontal direction, and n corresponds to the vertical direction) and generates a black image using the blocks, as will be described later. The pixels in the effective area are divided in the vertical direction so that each block is constituted of rows, the number of which is an integer multiple of 5 (=the number of fields).

In step S19, the system controlling circuit 120 determines whether electric charge signals corresponding to K fields, set in step S13, have been read. Since the reading is not performed immediately after the black image has been captured, the determination is always no in step S19, and the flow proceeds to step S20.

In step S20, electric charge signals corresponding to one field are read, and the read electric charge signals are converted into digital signals. In step S21, the block integrating circuit 104 integrates the converted digital signals for the corresponding pixels on a block-by-block basis using m×n blocks, and calculates an average of integrated values by the number of integrated pixels on a block-by-block basis. In step S22, the average for each block (hereinafter referred to as the "field block average signal") is stored in the memory 105. After the average has been stored, the flow returns to step S19, and the system controlling circuit 120 determines whether electric charge signals corresponding to K fields have been read. When the reading is not completed, the foregoing processing in steps S20 to S22 is repeated for the next field.

When it is determined in step S19 that the reading and storing of electric charge signals corresponding to K fields have been completed, the flow proceeds to step S23. In step S23, the block integrating circuit 104 integrates K field block average signals corresponding to K fields, which are stored in the memory 105, on a block-by-block basis and calculates an average of the integrated values by K. For example, when electric charge signals corresponding to five fields are read, the following field block average signals are obtained:

AveBlock1 (x, y): field block average signal of the first field

AveBlock2 (x, y): field block average signal of the second field

AveBlock3 (x, y): field block average signal of the third field

AveBlock4 (x, y): field block average signal of the fourth field

AveBlock5 (x, y): field block average signal of the fifth field

Thus, $$AveBlock(x,y)=(AveBlock1(x,y)+AveBlock2(x,y)+AveBlock3(x,y)+AveBlock4(x,y)+AveBlock5(x,y))/5 \quad (1)$$

where x is the block number in the horizontal direction in which x=0 to m−1, and y is the block number in the vertical direction in which y=0 to n−1.

Accordingly, the average of each of the m×n blocks can be obtained. Hereinafter, the average AveBlock (x,y) for each block is referred to as a "block average signal".

Block average signals calculated in step S23 (average signals of blocks in a second area) are converted (enlarged) by the resizing unit 106 to the resolution of the object image signals. The obtained signals are referred to as "black image signals". The black image signals correspond to third image signals or seventh image signals.

In step S25, the subtracting circuit 107 subtracts the black image signals obtained in step S24 from the object image signals obtained in step S17, thereby applying dark shading correction to the object image signals. The digital gain circuit 108 multiplies each of the object image signals corrected in this manner by gain (step S26), and the offset circuit 109 adds a preset offset value to each of the gain-multiplied object image signals (step S27). Thereafter, the signals are transferred to the signal processing circuit 110. The signal processing circuit 110 converts the signals into general image signals (for example, Joint Photographic Experts Group (JPEG) image signals) (step S28), and the converted image signals are recorded in the storage medium 111, such as an SD card (step S29).

Next, a method of determining the number of fields K to be read, which is performed in step S13, is described. This determination is performed by the system controlling circuit 120, which corresponds to a determination unit.

By reducing the number of fields to be read, the time required to read electric charge from the image pickup element 101 can be reduced. In contrast, when the number of fields to be read is reduced, the number of pixels integrated per block is reduced, which results in deterioration of the signal-to-noise (S/N) ratio. Accordingly, in the first exemplary embodiment, the number of fields K to be read is changed according to each preset sensitivity. When the sensitivity is low, sensor noise (random noise) is small. Thus, the number of fields K is reduced to achieve high-speed processing. When the sensitivity is high, the number of fields K is increased to generate a dark-shading-corrected image without deteriorating the S/N ratio, though the processing time is slightly increased.

A more specific example of a method of calculating K is described below.

For example, the following expression holds true:

$$N > N_{100}\sqrt{n} \quad (2)$$

where N is a noise value, n is the number of pixels for calculating an average, and $N_{100}$ is a noise value when one pixel is read in the case of ISO 100.

Expression (1) is solved for n:

$$N > (N_{100}/N)^2 \quad (3)$$

In contrast to the noise value $N_{100}$ when one pixel is read, if the noise value N is reduced to be less than or equal to 0.5, no adverse effect is exerted on the image signal when the average of plural pixels is calculated. When the noise value $N_{100}$ serves as a reference (100%, that is, 1), in the case of ISO 100, n=4 is derived from expression (3). When four or more pixels are read, the noise value N becomes 0.5 or less, and no adverse effect is likely to be exerted on the image signal.

When the S/N ratio is expressed in terms of decibel (dB) for voltage comparison, the S/N ratio can be expressed as 20*log (N/S). For example, in the case of ISO 100, when a signal value S of a digital image signal obtained by A/D conversion is 200, and the noise value N is 1, the S/N ratio is:

$$S/N(ISO100) = 20*\log(1/200) \approx -46 \text{ dB} \quad (4)$$

In contrast, when the average of four pixels is calculated, the S/N ratio is:

$$S/N(ISO100) = 20*\log(0.5/200) \approx -52 \text{ dB} \quad (5)$$

A noise value $N_{200}$ when one pixel is read in the case of ISO 200 is twice the noise value $N_{100}$ (200%). Accordingly, in order to make the noise level N=0.5 similar to that in ISO 100, the following is derived from expression (3):

$$n > (2/0.5)^2 \; n > 16 \quad (6)$$

Accordingly, it is clear that the minimum number of additional pixels n in order to make N=0.5 as in ISO 100 is 16 pixels.

Similarly, the minimum number of additional pixels n is 64 pixels in ISO 400, 256 pixels in ISO 800, and 1024 pixels in ISO 800.

Figure 4A:
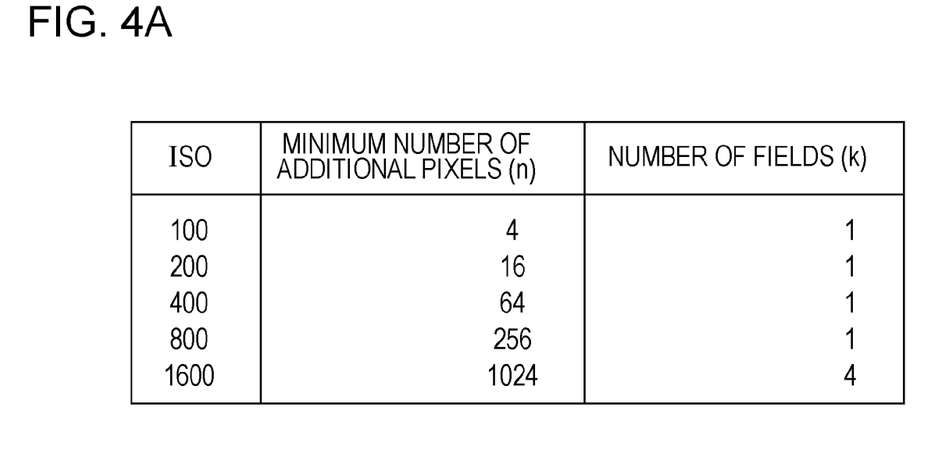
FIGS. 4A and 4B are tables for describing the relationship among the sensitivity, the minimum number of additional pixels, and the number of fields according to the first exemplary embodiment.
Figure 4B:
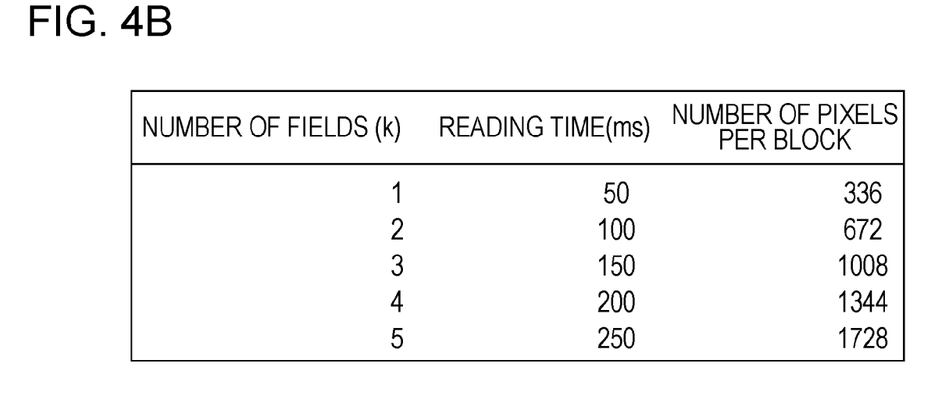

FIG. 4B illustrates the reading time according to the number of fields to be read in the case of a 5-field-reading image pickup element with 7M (3072×2310) pixels, and the number of pixels to be read in the case where the pixels are divided into blocks having 64 columns (obtained by dividing the pixels in the horizontal direction) and 64 rows (obtained by dividing the pixels in the vertical direction). In this case, each block is constituted of pixels corresponding to 48 columns in the horizontal direction and 35 rows in the vertical direction (the last block contains 105 rows).

When electric charge read by performing 1-field reading is integrated on a block-by-block basis, the number of pixels of each block is 48 pixels in the horizontal direction, and 7 pixels in the vertical direction, that is, 48×7=336 pixels in total. When 2-field reading is performed, the number of pixels of each block is 48 pixels in the horizontal direction, and 14 pixels in the vertical direction, that is, a total of 672 pixels. Similarly, when 3-field reading is performed, the number of pixels of each block is 1008 pixels. When 4-field reading is performed, the number of pixels of each block is 1344 pixels. When 5-field reading is performed, the number of pixels of each block is 1728 pixels. Since the number of pixels per block read from one field is 336 pixels, noise can be sufficiently reduced, up to ISO 800, when one field (K=1) is read. In the case of ISO 1600, there will be no adverse effect of noise when four fields (K=4) are read.

FIG. 4A is a table illustrating the minimum number of additional pixels n required for preventing deterioration of the S/N ratio and the number of fields K necessary for reading the minimum number of additional pixels n in the case of ISO 100, 200, 400, 800, and 1600. As is clear from the foregoing description, the minimum number of additional pixels n and the number of fields K change as the conditions such as the resolution and characteristics of the image pickup element 101 change.

As described above, the time required to read electric charge signals obtained by capturing a black image can be reduced by controlling the number of fields to be read. Accordingly, the processing can be performed at a significantly faster rate. For example, when the image pickup element 101 is a 5-field-reading 7M pixel sensor, the time required to read all pixels is about 250 ms, though dependent on the drive frequency. In contrast, the time required to read only one field is about 50 ms, resulting in a significantly faster rate.

According to the present embodiment described above, the processing rate can be increased and noise in black image signals can be reduced by measuring a noise value according to each preset sensitivity and determining the number of fields K to be read from the image pickup element, which is necessary for applying dark shading correction. The foregoing description concerns the operation in which the number of fields K to be read from the image pickup element, which is necessary for applying dark shading correction, is determined in accordance with the ISO speed rating. However, in the present embodiment, the number of fields necessary for applying dark shading correction may be fixed, regardless of the ISO speed rating. For example, when a black image is captured, one field of an image is read, which is used for applying dark shading correction.

Second Exemplary Embodiment

A second exemplary embodiment according to the present invention is described below.

Figure 6A:
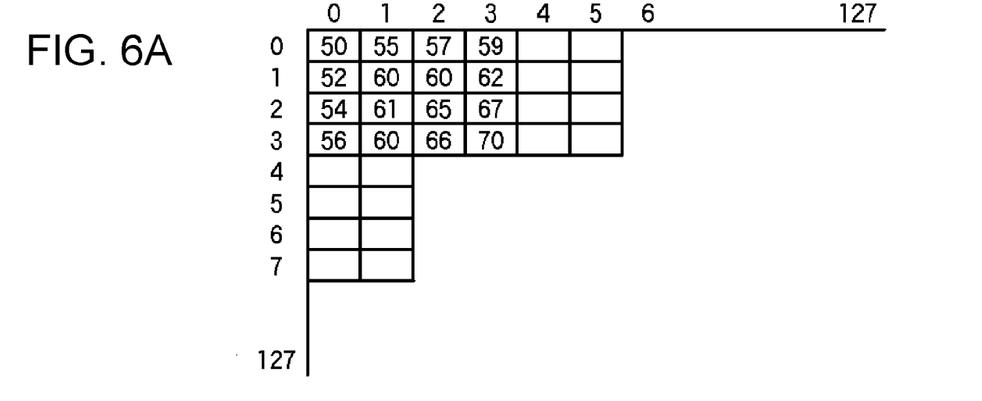
FIGS. 6A to 6C are illustrations for describing a process of generating a black image signal according to the second exemplary embodiment.
Figure 6B:
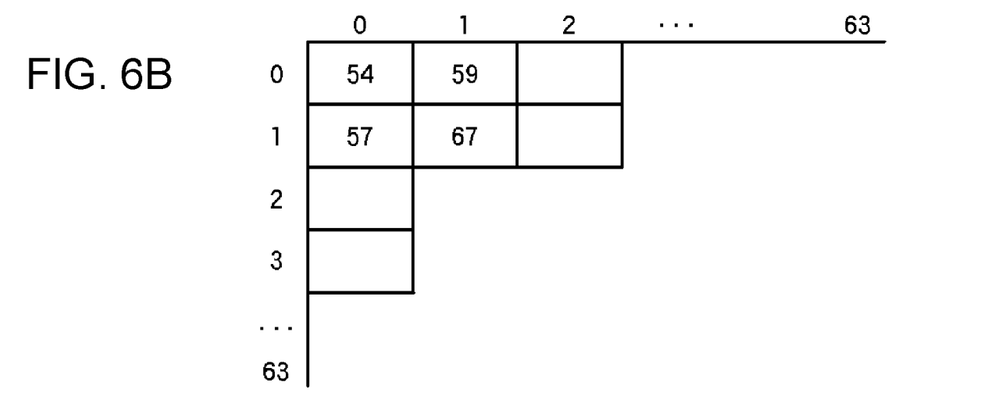

In the second exemplary embodiment, the minimum number of blocks necessary for applying dark shading correction is variable according to the amount of noise and a geometric pattern of shading that occurs. FIG. 6A illustrates the case where black is partly blurred (including blocks in a first area). In such a case, for example, correction is inadequate when the pixels are divided into 64×64 blocks, as shown in FIG. 6B. Therefore, according to the second exemplary embodiment, the following processing is performed to generate black image signals for use in applying dark shading correction, thereby reducing the amount of inadequate correction.

Since the structure of an image pickup apparatus according to the second exemplary embodiment is similar to that of the first exemplary embodiment described with reference to FIG. 1, a description thereof is omitted.

In the second exemplary embodiment, as in the first exemplary embodiment described above, it is assumed that the image pickup element 101 is a 5-field-reading image pickup element with 7M (3072×2310) pixels. The pixels are divided into 128×128 blocks in the horizontal and vertical directions. Accordingly, each block is constituted of pixels corresponding to 24 columns in the horizontal direction and 15 rows in the vertical direction (the last block contains 390 rows).

The image pickup operation of the image pickup apparatus according to the second exemplary embodiment is similar to that described with reference to the flowchart shown in FIG. 2. The only difference from the first exemplary embodiment is the processing performed by the resizing unit 106 in step S24. Therefore, this processing is described in detail with reference to the flowchart shown in FIG. 5. As has been described above, according to the second exemplary embodiment, in the processing performed in step S23 of FIG. 2, block integration is performed in small units, that is, on a block-by-block basis using 128×128 blocks. Block average signals obtained by this processing are referred to as "first block integration signals". The first block integration signals correspond to third image signals.

Figure 5:
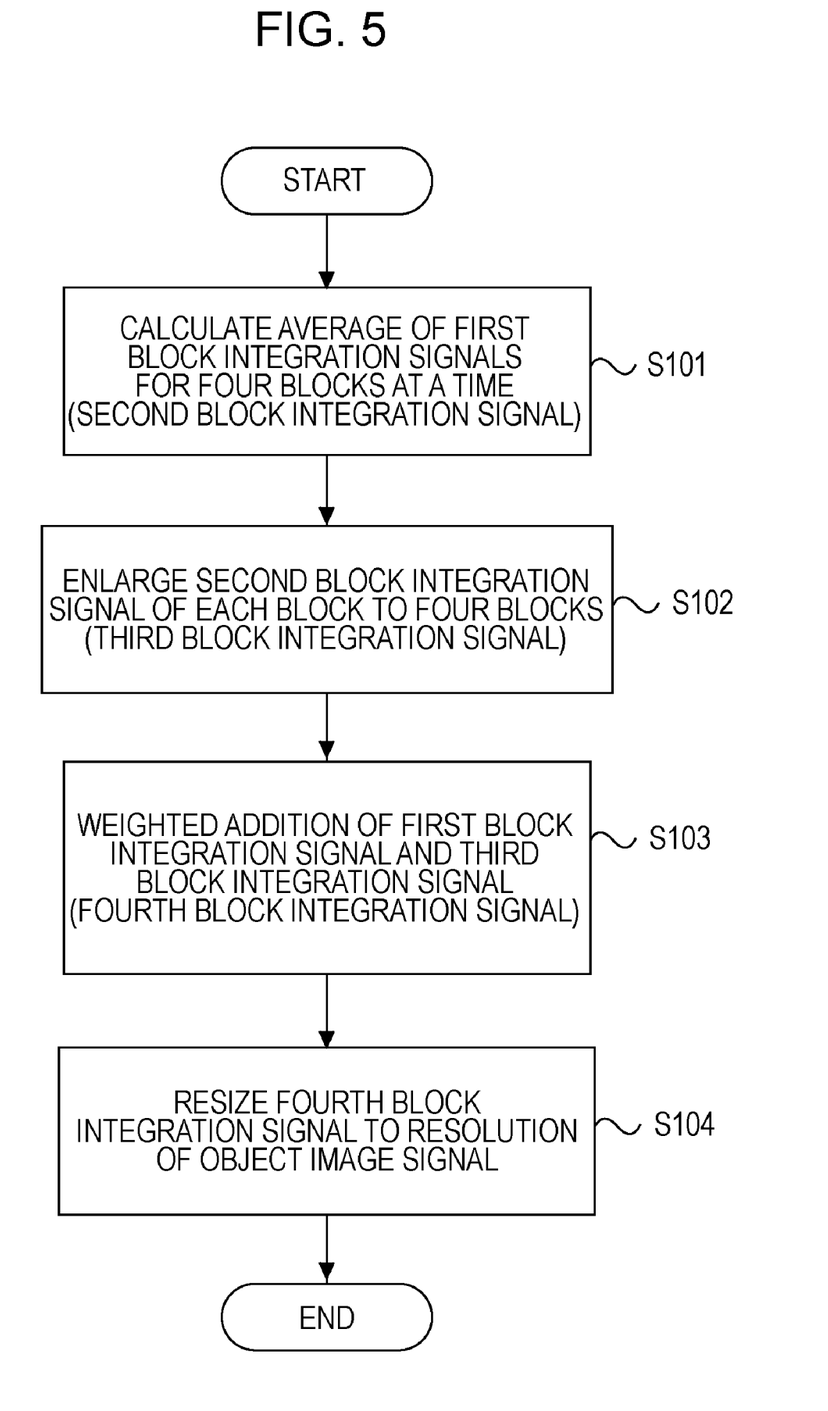
FIG. 5 is a flowchart of a process of generating a black image signal according to a second exemplary embodiment of the present invention.

In step S101 of FIG. 5, the first block integration signals are added in units of four blocks, and the average thereof is calculated, thereby obtaining a block average signal (hereinafter referred to as a "second block integration signal") on a block-by-block basis using 64×64 blocks. When the first block integration signals are, for example, signals shown in FIG. 6A, second block integration signals are calculated as follows:

$$Block2(0, 0) = (Block1(0, 0) + Block1(1, 0) + Block1(0, 1) + Block1(1, 1))$$ (7)
$$= (50 + 55 + 52 + 60)/4$$
$$= 54$$

$$Block2(1, 0) = (Block1(2, 0) + Block1(3, 0) + Block1(2, 1) + Block1(3, 1))$$ (8)
$$= (57 + 59 + 60 + 62)/4$$
$$= 59$$

FIG. 6B illustrates the second block integration signals.

Figure 6C:
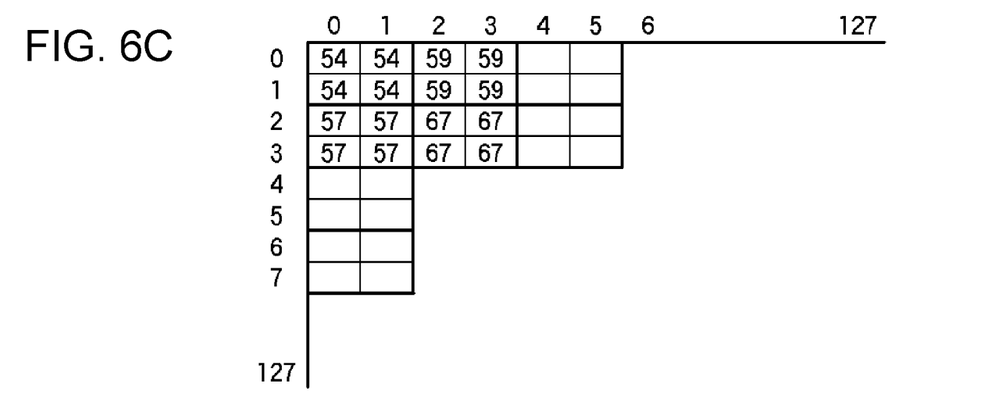

In step S102, the second block integration signal of each block is enlarged to four blocks, and a block average signal (hereinafter referred to as a "third block integration signal") is obtained on a block-by-block basis using 128×128 blocks. Third block integration signals correspond to fourth image signals. FIG. 6C illustrates the third block integration signals.

Figure 7A:
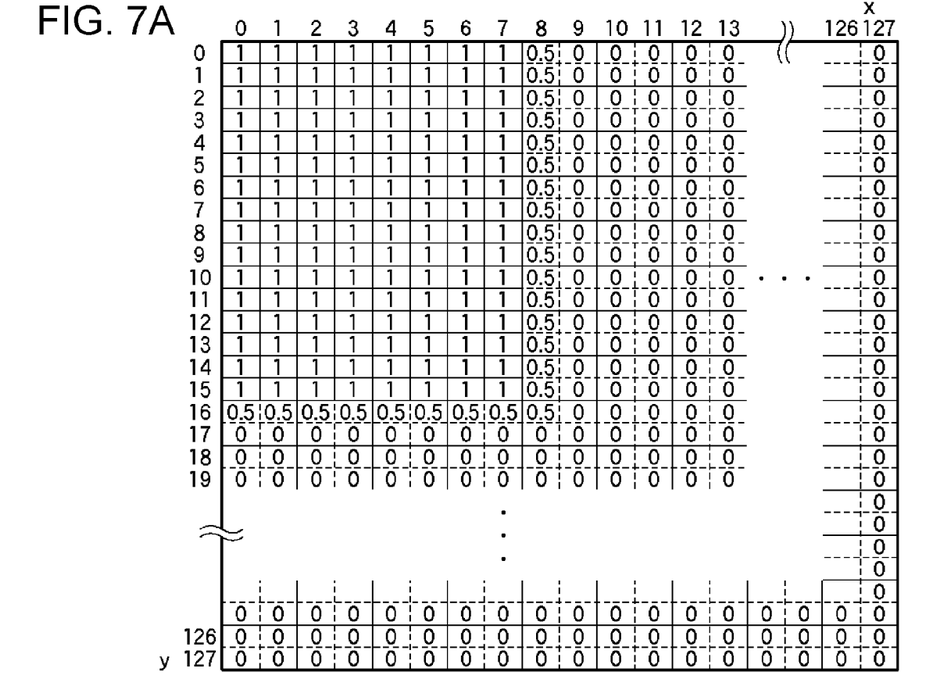
FIGS. 7A and 7B are illustrations for describing a process of generating a black image signal according to the second exemplary embodiment.

In step S103, 128×128 preset weighted addition coefficients, such as those shown in FIG. 7A, are used to perform weighted additions of the first block integration signals and the third block integration signals on a block-by-block basis, thereby generating fourth block integration signals.

$$Block4(x,y)=Block1(x,y)×α+Block3(x,y)×(1−α)$$ (9)

The fourth block integration signals correspond to fifth image signals. The weighted addition coefficients shown in FIG. 7A are stored in advance as a correction table in a memory (not shown).

The fourth block integration signals generated in the foregoing manner are further converted (enlarged) to the resolution of the object image signals, thereby generating black image signals. The black image signals correspond to sixth image signals. In step S25 of FIG. 2, the subtracting circuit 107 subtracts the black image signals obtained in this manner from the object image signals obtained in step S17, thereby applying dark shading correction to the object image signals. As shown in FIG. 7A, since the left-hand corner corresponds to areas where the pixels are divided into many blocks, the foregoing technique is effective for the case where black is partially blurred.

Figure 7B:
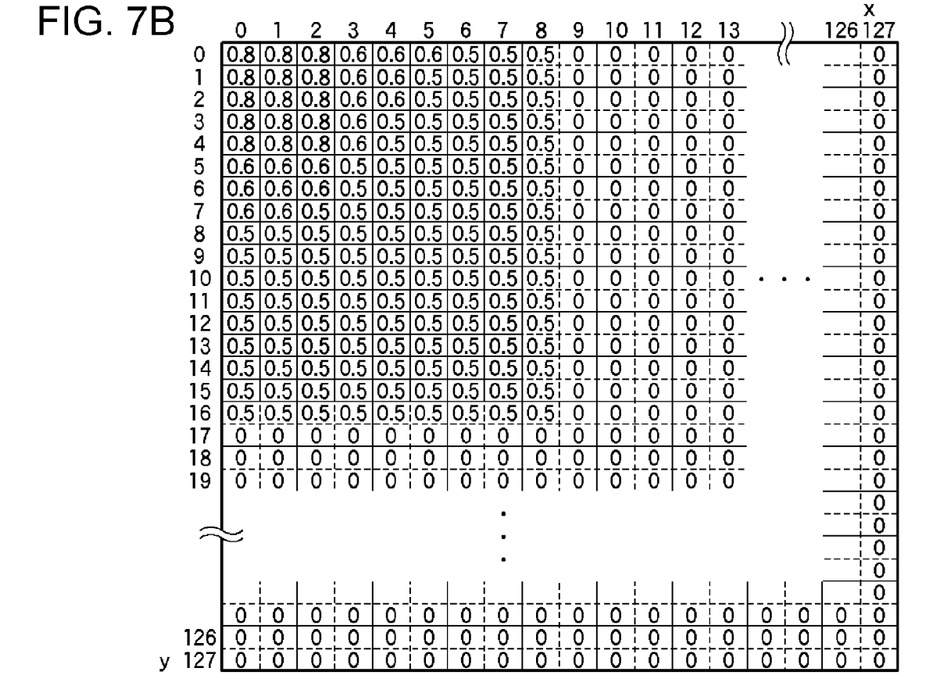

With the foregoing technique, as the number of blocks used for generating a dark-shading-corrected image is increased, the number of pixels integrated per block is reduced. Accordingly, in some cases, a random noise component of a black image signal is not completely eliminated. That is, when the image pickup element having 7M pixels is divided into 128×128 blocks, the number of pixels integrated per block is 360 pixels at maximum (=24×15), which falls short of 1024 pixels, which is the necessary number of pixels integrated to reduce noise in the case of ISO 1600. Therefore, for ISO 1600, as shown in FIG. 7B, in areas where the pixels must be divided into many blocks, the weighted addition coefficients using the first block integration signals are reduced. Accordingly, a harmonious balance between the amount of inadequate correction (inadequate correction is eliminated or reduced by dividing the pixels into many blocks) and noise reduction (the effect of random noise is reduced by increasing the number of pixels per block) may be achieved.

Further, there is a downside that a large amount of blurred black due to dark shading causes a reduction in the signal value of a high luminance portion. In the image pickup apparatus according to the second exemplary embodiment, the amount of blurred black is measured in advance, and an image is captured with the amount of exposure being slightly less than a proper amount of exposure according to the measured amount of blurred black. With digital gain, a saturation level of the image is maintained. This operation is described below.

Figure 8A:
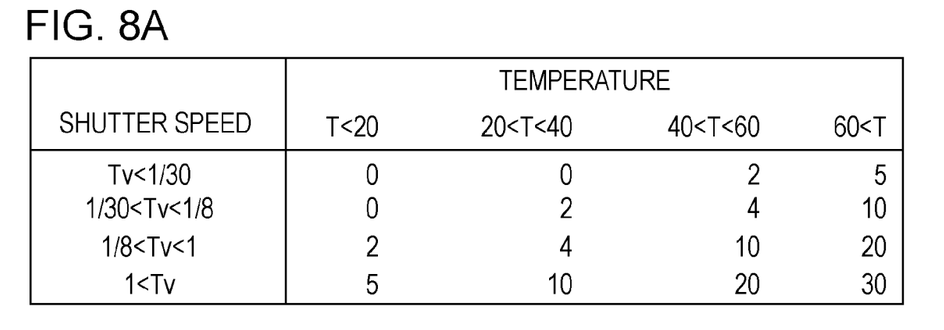
FIGS. 8A and 8B are tables of an exemplary amount of blurred black relative to the temperature and shutter speed (Tv) of an image pickup element in the case of ISO 100 and ISO 1600 according to the second exemplary embodiment.
Figure 8B:
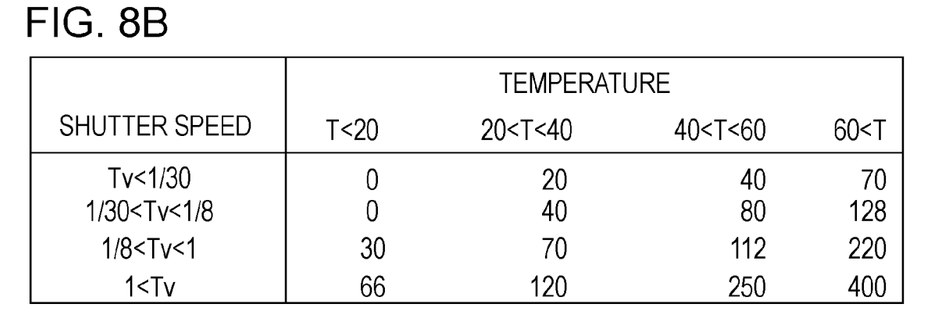

FIGS. 8A and 8B are tables of an exemplary amount of blurred black relative to the temperature and shutter speed (Tv) of the image pickup element in the case of ISO 100 and ISO 1600. For example, when Tv=1/45 seconds and the temperature of the image pickup element is 45 degrees in the case of ISO 100, the amount of blurred black is 2, as shown in FIG. 8A, in terms of a digital value obtained after A/D conversion.

For example, when the A/D converter 102 converts an analog image signal into a 10-bit digital signal, a pixel value of a saturation signal is 1023. Here, when the temperature of the image pickup element is 62 degrees and the shutter speed is 1/15 seconds in the case of ISO 1600, the amount of blurred black is 128, as shown in FIG. 8B. In this case, the value of the saturation signal after A/D conversion needs to be:

$$\text{pixel value+amount of blurred black}=1023+128=1151$$ (10)

However, since the 10-bit A/D conversion is performed, the pixel value is limited to 1023. The foregoing black image signal for applying dark shading correction, namely, 128 LSB of the amount of blurred black, is subtracted from 1023:

$$\text{camera output value−amount of blurred black}=1023−128=895$$ (11)

Accordingly, the pixel value of the saturation signal is not 1023. This is a phenomenon of lack of saturation due to blurred black.

In the second exemplary embodiment, the amount of exposure for capturing an image of an object is set to be slightly less than a proper amount of exposure according to the amount of blurred black, and an image of the object is captured. After dark shading correction is applied to an object image signal, the corrected signal is multiplied by digital gain, thereby maintaining the saturation level. A detailed control method is described below. This processing may be performed in exposure control performed in step S12 of FIG. 2.

Figure 9:
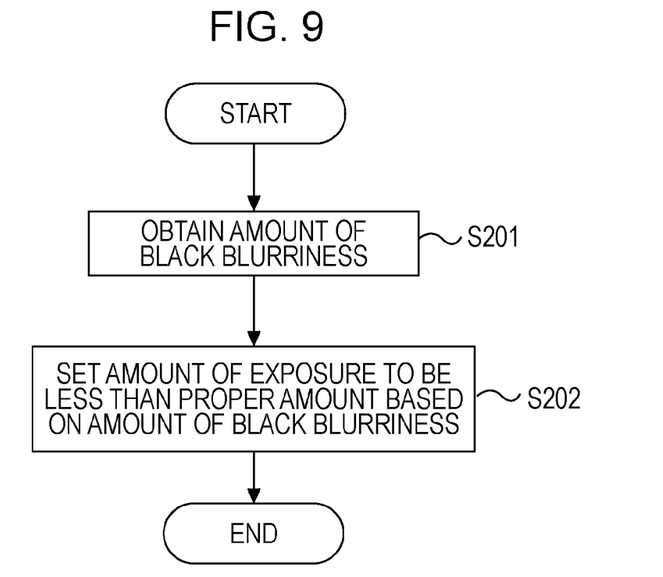
FIG. 9 is a flowchart of a method of setting the amount of exposure according to the second exemplary embodiment.

In step S201 of FIG. 9, the amount of blurred black of the image pickup element 101 is obtained. The amount of blurred black depends on the sensitivity, temperature, and shutter speed of the image pickup element 101. Accordingly, with an arbitrary temperature and an arbitrary shutter speed, the amount of blurred black is measured in advance according to each sensitivity, as shown in FIGS. 8A and 8B. Using this measurement data, the amount of blurred black when capturing an image is estimated.

In step S202, the amount of exposure is determined based on the estimated amount of blurred black. For example, when the amount of blurred black is 128 in the case of 10 bits, the signal value Sat of dark-shading-corrected saturation pixels is as follows:

$$Sat=1023-128=895 \quad (12)$$

Accordingly, the amount of exposure is controlled and set to be 895 or less, instead of 1023, thereby limiting the saturation signal value after A/D conversion to 1023 or less. Because of the dark shading correction, the signal value has been reduced by 128, which is the amount of blurred black. Thus, the signal is multiplied by digital gain so as to become 1023 (that is, so as to compensate for a reduction in the amount of exposure), thereby maintaining the saturation signal level. In order to set the saturation signal level to 895 or less, the amount of exposure less than or equal to the following gain may be set:

$$gain=895/1023=0.87 \quad (13)$$

Based on the gain value, the amount of exposure is set to a value that is lower than the proper amount of exposure by an approximately quarter stage, and an image of the object is captured. In this case, the signal value of a saturation signal is:

$$1023 \times 0.8 = 818 \quad (14)$$

Even when the amount of blurred black is 128, the signal value after A/D conversion is 818+128=946. Hence, the signal value can be maintained within a 10-bit range.

In order to recover the signal value that has been obtained with the reduced amount of exposure (an approximately quarter stage less than the proper amount) to a signal value obtained with the proper amount of exposure, in step S26 of FIG. 2, the digital gain circuit 108 (which corresponds to an amplifying unit) amplifies the signal. Here, the signal is multiplied by a gain of 1.25 (=1/0.8) to compensate for the foregoing reduction in the amount of exposure.

As has been described above, according to the second exemplary embodiment, besides the advantages achieved by the first exemplary embodiment, even when black is blurred in the image pickup element, the amount of inadequate correction can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2007-182560 filed Jul. 11, 2007, which is hereby incorporated by reference herein in its entirety.

What is claimed is:

1. An image pickup apparatus comprising:
    an image pickup element configured to output image signals corresponding to one frame including a plurality of fields on a field-by-field basis, the image signals being obtained by photoelectric conversion;
    a control unit configured to control the image pickup element to output first image signals corresponding to one frame with the image pickup element being exposed to light and to output second image signals corresponding to fields fewer than the plurality of fields constituting one frame with the image pickup element being shielded from light;
    a generating unit configured to generate third image signals by converting the second image signal to a resolution of the first image signals; and
    a subtracting unit configured to subtract the third image signals from the first image signals.

2. The image pickup apparatus according to claim 1, wherein the subtracting unit subtracts the third image signals from the first image signals so as to apply dark shading correction to the first image signals.

3. The image pickup apparatus according to claim 1, wherein the control unit determines a number of the fields corresponding to the second image signals based on a sensitivity of the image pickup element.

4. The image pickup apparatus according to claim 1, further comprising:
    an obtaining unit configured to obtain an amount of blurred black;
    an exposure control unit configured to control exposure so that the amount of exposure of the image pickup element is reduced according to the obtained amount of blurred black; and
    an amplifying unit configured to amplify an image signal output from the subtracting unit so as to compensate for the amount of exposure reduced by the exposure control unit.

5. The image pickup apparatus according to claim 3, wherein the generating unit generates each of the third image signals by calculating an average of the second image signals for each of multiple blocks obtained by dividing the image pickup element and converting the average image signal for each block to a resolution of the first image signals.

6. The image pickup apparatus according to claim 5, wherein the control unit determines, for each block, the number of the fields so that the second image signals can be read based on a preset number of pixels according to each sensitivity, and
    wherein the preset number of pixels is the number of pixels based on which, when the average of the second image signals is calculated by the black image generating unit for each block, random noise of the average image signal is lower than a preset noise value.

7. A method for controlling an image pickup apparatus including an image pickup element configured to output image signals corresponding to one frame including a plurality of fields on a field-by-field basis, the image signals being obtained by photoelectric conversion, the method comprising:
    controlling the image pickup element to output first image signals corresponding to one frame with the image pickup element being exposed to light and to output second image signals corresponding to fields fewer than the plurality of fields constituting one frame with the image pickup element being shielded from light;
    generating third image signals by converting the second image signal to a resolution of the first image signals; and
    subtracting the third image signals from the first image signals.

8. The method according to claim 7, wherein the third image signals are subtracted from the first image signals so as to apply dark shading correction to the first image signals.

* * * * *